Jan. 17, 1928.

L. A. HAZELTINE 1,656,888

SIGNALING SYSTEM

Filed Aug. 18, 1926

INVENTOR
Louis A. Hazeltine
BY
Pennie, Davis, Marvin and Edmonds.
ATTORNEYS

Jan. 17, 1928.

L. A. HAZELTINE 1,656,888

SIGNALING SYSTEM

Filed Aug. 18, 1926

INVENTOR
Louis A. Hazeltine
BY Pennie, Davis, Marvin
and Edmonds.
ATTORNEYS

Jan. 17, 1928.

L. A. HAZELTINE 1,656,888

SIGNALING SYSTEM

Filed Aug. 18, 1926  6 Sheets-Sheet 3

INVENTOR
Louis A. Hazeltine
BY Pennie, Davis, Marvin
and Edmonds,
ATTORNEYS

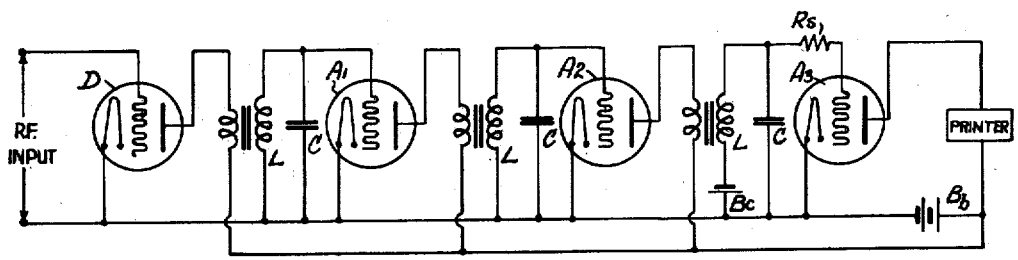
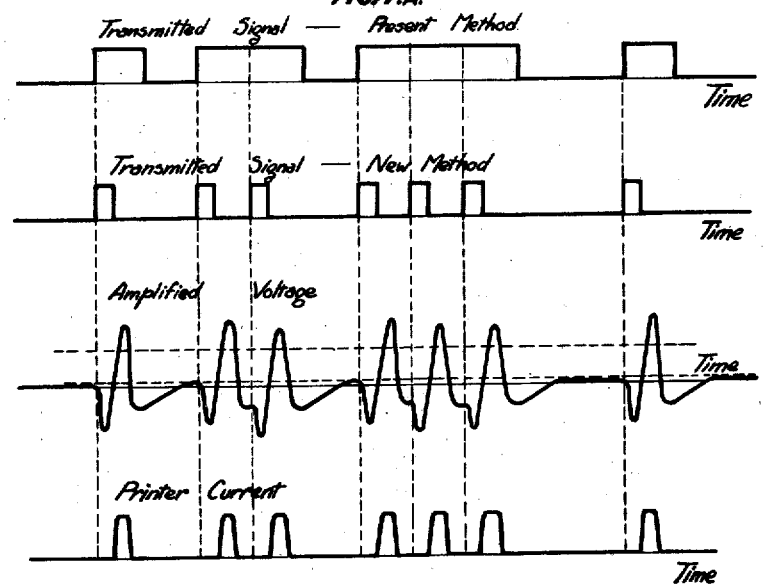

Jan. 17, 1928.

L. A. HAZELTINE

SIGNALING SYSTEM

Filed Aug. 18, 1926

INVENTOR
Louis A. Hazeltine
BY
Pennie, Davis, Marvin and Edmonds.
ATTORNEYS

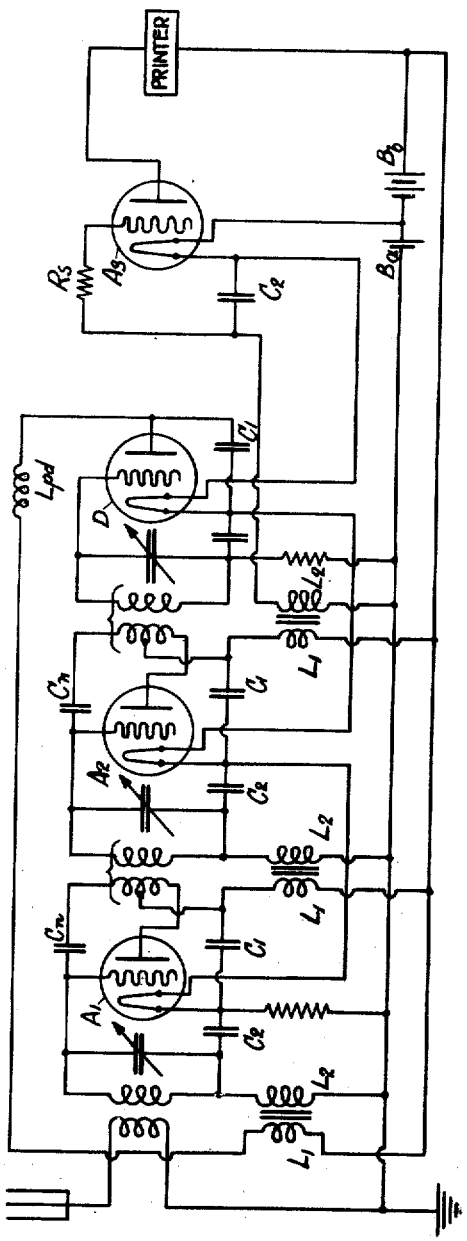

Patented Jan. 17, 1928.

1,656,888

UNITED STATES PATENT OFFICE.

LOUIS A. HAZELTINE, OF HOBOKEN, NEW JERSEY.

SIGNALING SYSTEM.

Application filed August 18, 1926. Serial No. 129,918.

This invention relates to a method and apparatus for amplifying telegraph signals and to the reduction of accompanying interference. It is particularly applicable to telegraph systems in which signals actuate an electromechanical device, such as a relay or an electrically operated printing mechanism.

This patent application is a continuation in part of my copending patent application Serial No. 12,000, filed February 27, 1925, issued November 8, 1927 as United States Letters Patent No. 1,648,808, Figures 5 and 6 herein being the same as Figures 6 and 7 of that patent.

The most serious limitation to radio transmission, whether telephone or telegraph, is ordinarily the presence of interference, particularly random interference or strays. While such interference cannot be completely eliminated without at the same time eliminating the signal, yet it can be greatly reduced by employing receiving apparatus which is effective for a suitably narrow band of frequencies. In telephone reception, this band must extend about 5000 cycles per second from the carrier frequency, in order to include the useful frequencies of the voice and music; but in telegraph reception with continuous waves the band need only be wide enough to include the keying or pulse frequency, which is ordinarily of the order of one hundred cycles per second or less.

The following method is representative of those heretofore available for excluding frequencies outside of the narrow band involved in continuous-wave telegraphy. First, a highly selective receiver is employed to give selectivity at the wave frequency; secondly, the heterodyne method of reception is used in which a local oscillator produces beats with the wave frequency, giving after detection a suitable audio frequency; and thirdly, an audio-frequency amplifier is employed which is tuned to this audio frequency. The results obtained by this method may be illustrated by a numerical example: Suppose that the wave frequency is 100,000 cycles per second. A sharply tuned radio-frequency amplifier may cover frequencies displaced up to one per cent., or one thousand cycles per second, from the carrier frequency. Components of interference appreciably outside of this band are attenuated prior to detection. After detection, the tuning at audio frequencies may be made sufficiently sharp so that the frequency band extends on each side of the fundamental audio frequency by the pulse frequencies only, components of interference outside of this band being attenuated.

The method of reception just outlined is suitable for reception by ear, but involves certain complications and disadvantages when applied to electromechanical apparatus. A local oscillator is required, as well as means for rectifying the audio-frequency signal to give direct-current pulses. Also it is necessary that the wave frequency and the frequency of the local oscillator be exceedingly constant, well within the pulse frequency, which means a constancy, under the conditions assumed above, of a few hundredths per cent. At considerably higher radio frequencies, which are now coming into use, conditions are correspondingly more severe; for example, at 10,000,000 cycles per second, the constancy in frequency must be within a few ten-thousandths per cent., which can hardly be considered practicable, and the tuning of the audio-frequency amplifier would also have to be impracticably sharp.

In accordance with this invention, a continuous-wave telegraph signal is first amplified at the wave frequency by a highly selective receiver, such as described in my patent referred to above. This will highly attenuate interfering signals and disturbances at the wave frequency. The amplified signal is then detected without the use of the heterodyne method or any form of local modulation. The detected signal is then amplified by a vacuum-tube amplifier, which is effective for the pulse frequencies only. Finally, the amplified signal impulses are arranged to actuate an electromechanical device. The result is the highest attainable selectivity against interference, with a considerable simplification in apparatus and without the necessity for extreme constancy of signal frequency, variations of a few tenths per cent. being ordinarily unimportant. The pulse-frequency amplifier furthermore is arranged to limit the intensity of the signal pulses so that the electromechanical device is actuated uniformly by signals of any strength above a certain minimum. Further features of this invention applicable to particular circumstances will appear in the following description.

The most complete reduction of interference, in accordance with this invention, can be obtained only by the cooperation of selectivity at the wave frequency before detection and selectivity at low frequency after detection. This is for the following reasons: Radio interference, particularly from strays, includes waves of various frequencies. Two waves of different frequency will produce beats which are combined by the process of detection; and the result will have a frequency which is the difference between the two wave frequencies. When a signal wave is absent, strays will be evidenced due to the beats between their various components. When a signal wave is present, there will in addition be beats between the strays and the components of the signal wave, mainly the carrier wave. Stray interference of the first sort is most effectively reduced by radio-frequency selectivity—that is, several tuned circuits in cascade each with a sharp resonance curve; but further selection against the high frequencies of the detected interference is still helpful. On the other hand stray interference of the second sort is most effectively reduced by amplifying only the low pulse frequencies of the signal and attenuating higher frequencies after detection for it is not generally feasible to make the resonance curve of each radio-frequency stage sufficiently sharp to amplify only within the narrow band of frequency involved in telegraph reception, as shown by the numerical example given in a preceding paragraph.

While this invention is primarily directed to radio telegraphy, it is also directly applicable to wire telegraphy employing alternating current, particularly of high frequency, commonly referred to as carrier current; and by the omission of the radio-frequency steps and of the detector, it is also applicable in part to wire telegraphy employing direct current.

Referring to the drawings:

Figure 1 is a diagram of connections of a pulse-frequency amplifier suited to receiving International Morse signals at varying speeds with a relay, a sounder, or an ink recorder having a fixed zero. Figure 1$^A$ is a response-frequency curve for the amplifier of Figure 1. Figure 1$^B$ shows the forms of amplified pulses due to a signal of infinite duration, for various numbers of stages in Figure 1. Figure 1$^C$ shows the forms of a succession of amplified pulses due to signal pulses of finite duration.

Figures 2$^A$, 2$^B$ and 2$^C$ correspond respectively to Figures 1$^A$, 1$^B$ and 1$^C$, but are for the amplifier of Figure 2.

Figures 3$^A$, 3$^B$ and 3$^C$ correspond respectively to Figures 1$^A$, 1$^B$ and 1$^C$ but are for the amplifier of Figure 3.

Figure 4 is a diagram of connections of an amplifier suited to receiving signal pulses of constant duration and relatively higher frequency, as in a printing telegraph system. Figure 4$^A$ shows a comparison of the transmitted signal pulses in the ordinary printing telegraph system and in the system most applicable to the amplifier of Figure 4, together with the amplified pulses in the latter system.

Figure 3:
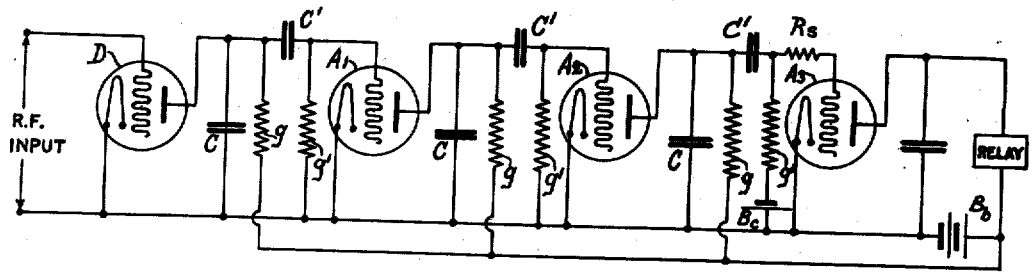
Figure 3 is a diagram of connections of an amplifier suited to receiving signal pulses of fixed duration and low frequency, such as time signals.
Figure 3A:
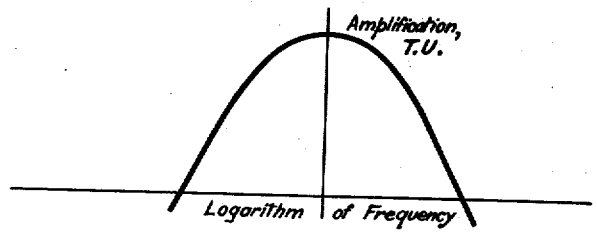
Figure 3B:
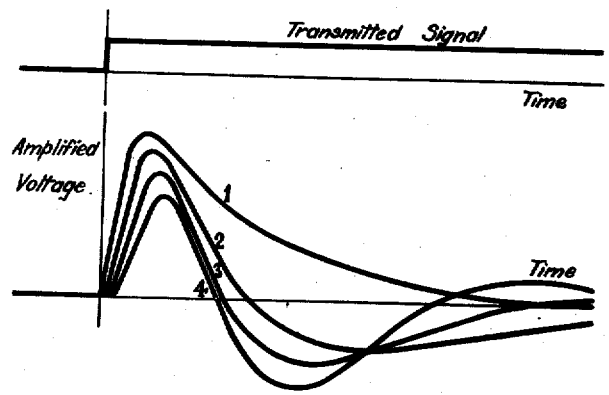
Figure 3C:
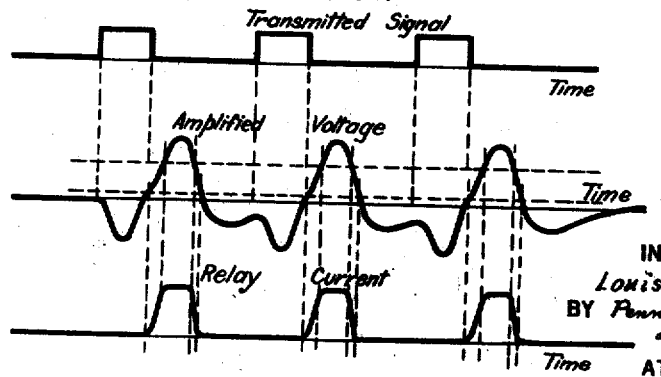
Figure 5:
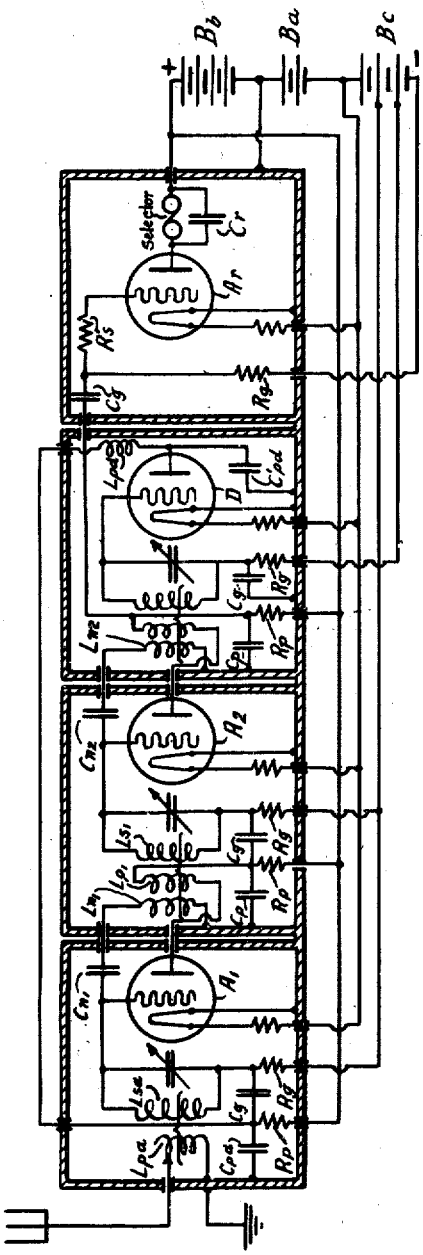

Figure 5 shows a combined radio-frequency and pulse-frequency amplifier suitable for the same purpose as Figure 3.

Figure 6:
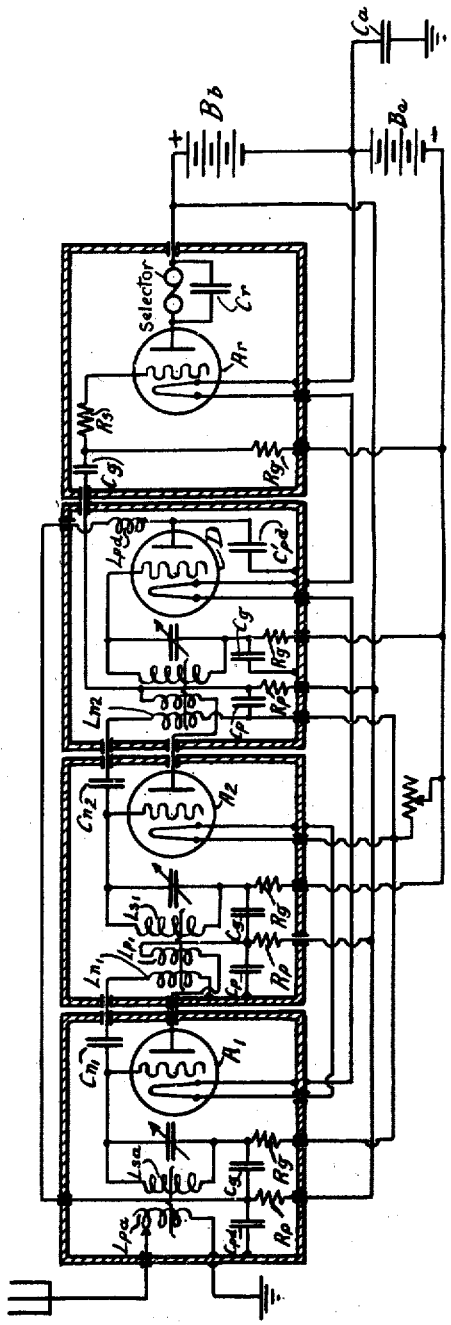

Figure 6 is a modification of Figure 5 in which the filaments of the vacuum tube are connected in series instead of in parallel.

Figure 7 is a diagram of connections of a combined radio-frequency and pulse-frequency amplifier suited to the same purpose as Figure 4.

In Figures 1, 2, 3 and 4, reference character D represents a detector vacuum tube in which radio-frequency signal pulses are converted into unidirectional pulses; $A_1$, $A_2$, $A_3$ represent pulse-frequency amplifier vacuum tubes ultimately actuating an electromechanical device, as a relay, recorder or other magnet; $g$, $g$ represent coupling resistors; C, C represent condensers shunting the respective coupling means; $C'$, $C'$ represent insulating condensers; and $g'$, $g'$ represent grid leak resistors.

Radio telegraph signals consist of pulses, known as dots and dashes, separated by spaces. In the International Morse code, the dashes have durations several times the durations of the dots; also the spaces are of varying duration, according as they represent the separation of the dots and dashes of a single letter or the separation of different letters and different words. The succession of such signal pulses may be analyzed into components having various frequencies, of which the so-called dot frequency is conspicuous. This is the fundamental frequency of a succession of dots, separated by the normal spaces between dots. To effectively reproduce the approximately rectangular form of such signal pulses requires the presence of harmonics of the dot frequency; but only the lower harmonic frequencies are important when it is not required to reproduce the exact forms of the pulses. The presence of dashes and longer spaces involves frequencies several times lower than the dot frequency.

Figure 1:
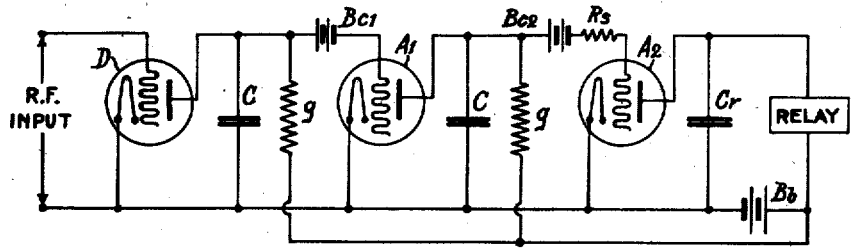
Figure 1A:
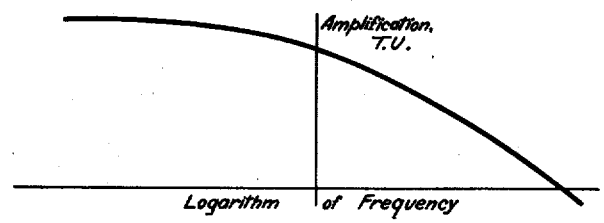
Figure 1B:
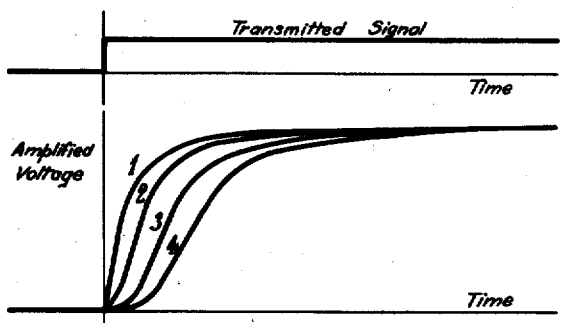
Figure 1C:
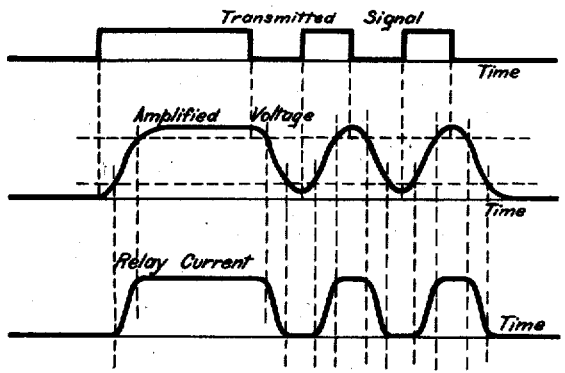

To properly amplify such impressed signals, it is necessary to employ an amplifier which is effective up to a frequency several times higher than the dot frequency. Higher frequencies than this may preferably be cut off to reduce interference. Figure 1 shows such an amplifier in which the cutting off of higher frequencies is accomplished primarily by the condenser C in each stage, the condenser $C_r$ in the output circuit having a like function. This is illustrated by the response-frequency curve of Figure 1$^A$, in which amplification and frequency are each plotted to a logarithmic scale, which is most conveniently done for amplification by the use of transmission units (T. U.). The amplifier is evidently effective for all frequencies to the left of the axis, and increasingly ineffective as we proceed to the right of the axis. The expression for the amplification is $$20n \log \frac{\mu g_p}{g_p+g} - 10n \log \left(1+\frac{\omega^2}{\omega_0^2}\right) \text{ T. U.} \quad (1)$$

where common logarithms are employed, and where the notation is as follows:

n = number of stages;
$\mu$ = amplification factor of vacuum tube;
$g_p$ = plate conductance of vacuum tube, mhos;
g = conductance of the resistor as indicated on Figure 1, mhos;
$\omega$ = actual angular frequency, radians per second;
$\omega_0$ = angular frequency at the axis, where the amplification begins to fall appreciably, as given by the equation $$\omega_0 = \frac{g_p+g}{C} \text{ radians per second,} \quad (2)$$

where C is the capacity in farads of the condenser, as indicated on Figure 1.

To more fully understand the action in a pulse-frequency amplifier, it is desirable to plot curves of amplified voltage against time. Such curves are illustrated in Figure 1$^B$, corresponding to a signal suddenly impressed and continuously maintained in the circuit of Figure 1. For convenience, the voltage scales have been so chosen that all curves approach the same constant height with increase in time. The numbers on the curves indicate the respective numbers of stages. It will be seen that with increased numbers of stages the voltage rises more slowly, particularly immediately after the signal starts. All combinations of rectangular signal pulses will result in amplified voltages that are derivable by adding and subtracting ordinates of curves of the forms of Figure 1$^B$, but appropriately displaced in time.

With resistance coupling, as in all the circuit diagrams except Figures 4 and 7, there is a reversal in the sense of the amplified voltage in going from one stage to the next. For simplicity, this has not been shown in Figure 1$^B$ and the corresponding Figures 2$^B$ and 3$^B$. Also, the sense of the voltage is changed if grid detection is employed instead of mutual detection—that is, if a grid condenser and associated leak are employed in the detector vacuum tube instead of a direct grid return connection to the filament. In all of the circuit diagrams shown, mutual detection is employed, which is preferable at the lower radio frequencies, as it eliminates the grid conductance which would lower the radio-frequency amplification of the stage preceding the detector.

In Figure 1$^C$ is shown a succession of transmitted signal pulses corresponding to the letter D in the International Morse code (dash dot dot). The starting of each signal pulse gives rise to an amplified pulse like one curve of Figure 1$^A$, and the stopping of a signal pulse gives rise to a similar amplified pulse, but reversed in sense. The result of the succession is indicated in the middle curve of Figure 1$^C$, which corresponds to two stages of amplification, as in Figure 1. The voltage of the battery $B_{c2}$ is chosen so that the grid potential is normally so negative that no current flows in the plate circuit of $A_2$, which includes the relay. The signal is supposed to be sufficiently strong so that the grid of $A_2$ would normally be made considerably positive by the signal pulse; but there is inserted in series with this grid a resistance $R_s$ which is so high that the drop in it due to the grid current which flows when the grid is positive limits the grid potential to a very low positive value. This effect is illustrated by the two dotted horizontal lines in Figure 1$^C$, the lower one corresponding to the grid potential which just reduces the plate current to zero, and the upper one corresponding to the grid potential which is barely positive. The curve of plate current then follows the grid potential curve between these two dotted lines, as shown by the lowest curve of Figure 1$^C$. With the limiting effect just described, this plate current varies between zero and a definite value, which is substantially independent of signal strength above a certain minimum, this minimum being the signal strength which is just sufficient to overcome the normal grid bias and to make the grid barely positive. The effect of stronger signals is simply to sharpen the corners of the plate-current curve. The use of $R_s$ thus results in a more regular response of the relay, and furthermore tends to prevent sticking of the relay that might occur due to the residual magnetism left by a larger current.

If in Figure 1, grid detection is employed with an even number of stages of pulse-frequency amplification, or mutual detection with an odd number, then the relay current will fall with the signal pulses, instead of rising as in Figure 1$^C$. In this case the grid potential should be made normally slightly positive, by giving the bias battery $B_{c2}$ a lower voltage. The relay magnet will then be released by the pulses, instead of being energized.

The constants of Figure 1 are chosen as follows: the conductance $g$ is given a value considerably less than the plate conductance $g_p$, as the usual compromise between amplification and minimizing the voltage of the plate battery $B_b$; the capacity $C$ is then chosen so that the time constant $C/(g_p+g)$ is of the order of one-tenth to two-tenths of the duration of the shortest signal pulse to be amplified, the higher value giving a more rounded curve, but less interference. The capacity $C_r$ in parallel with the relay may be adjusted to give this circuit a time constant of a similar order of magnitude, but may be omitted for simplicity. The resistance $R_s$ is made higher than the grid resistance of the vacuum tube with slightly positive grid, a value of 5 megohms being suitable with ordinary receiving tubes.

Figure 2:
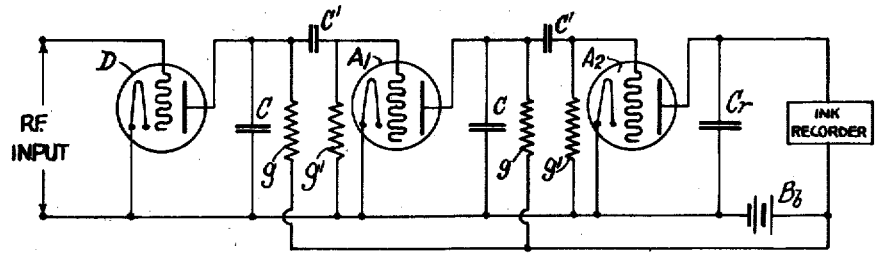
Figure 2 is a diagram of connections of a pulse-frequency amplifier suited to receiving International Morse signals at varying speeds with an ink recorder having a floating zero.
Figure 2A:
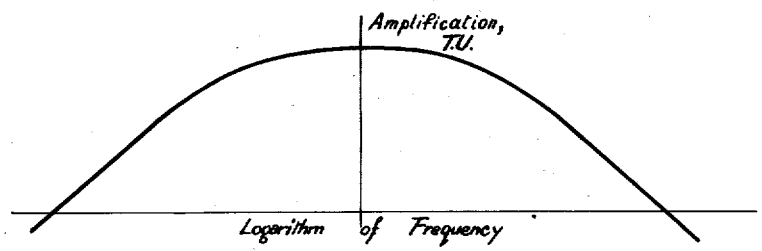
Figure 2B:
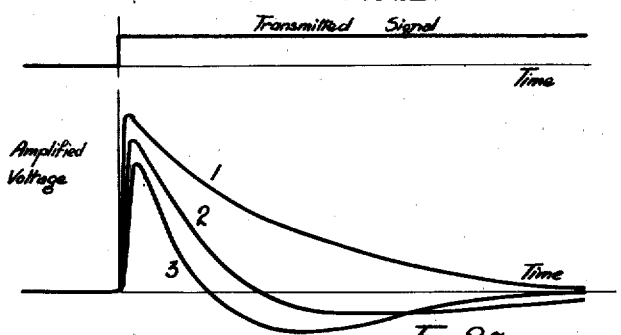
Figure 2C:
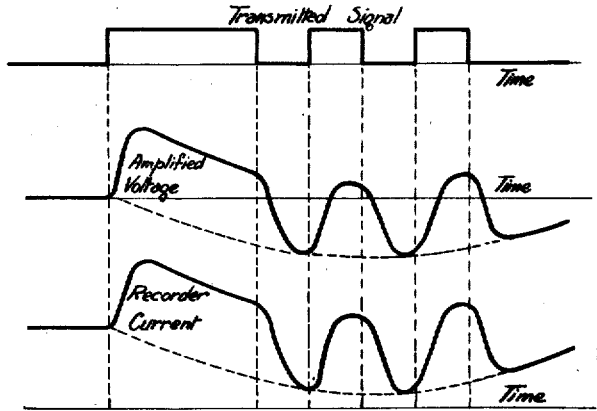

The use of the relatively high-voltage bias batteries $B_{c1}$ and $B_{c2}$ may be inconvenient, particularly as these batteries must have their voltages adjusted to suit the voltage of the plate battery $B_b$. In Figure 2 is shown an arrangement in which the batteries $B_{c1}$ and $B_{c2}$ are replaced by condensers $C'$ together with the leaks $g'$. The condensers $C'$ have the effect of preventing amplification at very low frequencies. This may be desirable in certain cases, but in any case will not be harmful if the frequencies which are cut off are lower than those needed to transmit the signal pulses. With the Morse code the frequency range required is relatively wide, as indicated by the response-frequency characteristic of Figure 2^A. The expression for the amplification is $$20n \log \frac{\mu g_p}{g_p + g + g'(1 + C/C')} - 10n \log \left(1 + \frac{4}{p^2} \sinh^2 x'\right) \text{ T. U.,} \quad (3)$$

where the notation is as in equation (1) and on Figure 2, with the following in addition:

$$p = \frac{g_p + g + g'(1 + C/C')}{\omega_0 C}; \quad (4)$$

$$x' = \text{nat. log } \frac{\omega}{\omega_0}; \quad (5)$$

$$\omega_0^2 = \frac{(g_p + g)g'}{CC'}, \quad (6)$$

$\omega_0$ being the angular frequency at which the response is a maximum.

With the arrangement of Figure 2, a prolonged signal pulse will not produce an amplified voltage which approaches a constant finite value, as in Figure 1^B, but will produce a voltage which approaches zero with reversals, as in Figure 2^B. The number of reversals is equal to the number of stages of amplification after the first, the numbers 1, 2, 3 of Figure 2^B corresponding respectively to 1, 2, and 3 stages. (As before, the vertical scales are different for the different curves).

The constants of Figure 2 are chosen as follows: $g$ is determined as in Figure 1; $g'$ is given a value ordinarily suitable for a grid leak, being as high as is convenient and consistent with a permanent value, considering the variable natural leakage of the grid circuit; $C$ is determined as in Figure 1; and $C'$ is chosen so that the time constant $C'/g'$ is at least ten times the duration of the shortest pulse to be amplified, larger values giving flatter dashes and being required if very long dashes are to be amplified legibly.

To obtain the relatively wide frequency band required for the Morse code, the constants of Figure 2 have been chosen so that the curves of Figure 2^B fall very much more slowly than they rise, the rise being mainly dependent on the value of $C/(g_p+g)$, the fall on the value of $C'/g'$. The result is that succeeding pulses affect one another; so the curves of amplified voltage and recorder current in Figure 2^C show sudden changes corresponding to the starting and stopping of the transmitted signal, but they have the effect of a floating zero, as indicated by the dotted lines. This does not seriously affect the legibility of signals when received on an ink recorder, such as the siphon recorder commonly used in submarine-cable telegraphy, but might make it difficult or impossible to employ an ordinary relay for reception, as in Figure 1.

The limitations of Figure 2 are largely due to the necessity of receiving pulses of varying duration. In some cases it is desired to receive signal pulses which are of fixed duration. An example is the reception of time signals, which are transmitted by the United States Government as a succession of pulses, each 0.35 sec. in duration, and at the rate of one pulse per second. Certain of these pulses are skipped during the sending of the time signals, giving certain longer spaces, but this does not introduce a limitation for the reasons that will be described. The pulse-frequency amplifier suitable for this purpose is illustrated in Figure 3, which is essentially the same circuit as Figure 2 (with an additional stage), but the constants are given different values. The equations given for Figure 2 are applicable in this case also, but the frequency band is made as narrow as practicable (Figure 3^A) by making $C'$ small compared with $C$ and by making the two time constants not very different, as described below.

Figure 3^B shows curves of amplified voltage against time for the circuit of Figure 3. These curves are generally similar to those of Figure 2^B, but are more rounded. The curve for three stages reverses twice, the second lobe being comparable with the first, and the third lobe being very small. This feature makes a three-stage arrangement particularly applicable in the reception of signals of constant duration; for the first lobe on starting of a signal pulse may be made negative (by employing mutual detection), and the second lobe may be made to coincide with the first lobe due to the stopping of the pulse. This is illustrated in Figure 3^C, where the amplified voltage starts with a negative lobe, followed by a relatively high positive lobe. With a relatively long space between signal pulses the corresponding negative lobe has two peaks. By arranging the grid of the last amplifier tube $A_3$ with a suitable negative bias voltage from the battery $B_c$, so that the plate current is normally zero or very near zero, the negative lobes have no effect on the plate current. Furthermore, the positive lobes are limited by the resistance $R_s$, as described previously; and the lobe following the last reversal of curve 3 in Figure 3^B is too small to appreciably affect the current. Therefore the current consists of simple approximately rectangular pulses, as indicated at the bottom of Figure 3^C. Such pulses reproduce substantially the original form of signal and are well suited to actuate a relay or selector.

If grid detection is employed, the bias battery $B_c$ should be omitted or reversed. The amplified current pulses will then be similar in form but reversed in sense relative to those of Figure 3^C; and the relay will be released by the pulses instead of being energized. With both forms of detection, however, the resistance $R_s$ and the rectifying effect of the vacuum tube combine to suppress the initial and final swings of the three swings which tend to be produced in the output current by an impressed signal pulse.

The constants of Figure 3 are chosen as follows: the conductances $g$ and $g'$ are determined as in Figure 2; C is chosen so that the time constant $C/(g_p+g)$ is of the order of one-tenth to two-tenths the duration of the signal pulse, as in Figures 1 and 2; and $C'$ is chosen so that the time constant $C'/g'$ is of the order of four-tenths to eight-tenths the duration of the signal pulse. If the two time constants were made equal (for example, two-tenths to four-tenths the pulse duration), the value of $p$ would be a minimum (approaching 2 when $C'/C$ is made small), and the selectivity against interference would be the highest possible, but the amplification would fall considerably. The values specified, with $C'/g'$ about four times $C/(g_p+g)$, gives a suitable compromise. The value of $R_s$ is determined as in Figure 1; but it may be omitted without great effect, as the coupling resistances and capacities themselves will serve to limit the grid current and the positive grid potential.

In the reception of time signals the frequency of one cycle per second is too low to permit of an economical design of coupling transformer; and for that reason the combination of resistances and capacities shown in Figure 3 is most suitable. When signal pulses of constant duration, but succeeding one another more rapidly, are employed, the arrangement of Figure 4 may be substituted for that of Figure 3, with the advantages that the transformers may be given a step-up ratio, resulting in higher amplification, and a plate battery $B_b$ of lower voltage may be used.

While the circuit of Figure 4 contains wholly reactive elements in the coupling system, yet if the values are chosen to make it aperiodic in combination with the plate conductance $g_p$, it has identically the same forms of response-frequency curve and of voltage-time curves as the necessarily aperiodic circuit of Figure 3. The expression for the amplification is $$20n \log \frac{\tau \mu g_p}{g_p + \tau^2 g} - 10n \log \left(1 + \frac{4}{p^2} \sinh^2 x'\right) \text{T.U.,} \quad (7)$$

where the notation is the same as previously, except for the following:

$g$ = natural conductance of transformer referred to the secondary, mhos;
$\tau$ = ratio of transformation, secondary to primary;

$$p = \frac{g_p + \tau^2 g}{\tau^2 \omega_0 C}. \quad (8)$$

$$x' = \text{nat. log} \frac{\omega}{\omega_0}; \quad (9)$$

$$\omega_0^2 = \frac{1}{CL}; \quad (10)$$

C = secondary capacity as indicated on Figure 4, farads;
L = secondary self-inductance as indicated on Figure 4, henries.

The constants of Figure 4 are chosen as follows: the secondary self-inductance L is made as high as is economical; the conductance $g$ is made as low as is convenient and economical; the ratio is chosen so that the inductance time constant $L(g_p + \tau^2 g)/\tau^2$ is of the order of four tenths to eight tenths the duration of the signal pulse; and the capacity C is chosen so that the capacity time constant $\tau^2 C/(g_p + \tau^2 g)$ is of the order of one-tenth to two-tenths the duration of the signal pulse. The values just given correspond to a ratio of four to one between the two time constants, which makes the circuit barely aperiodic and corresponds to $p=2$, the limiting value in Figure 3. A relatively larger capacity would make the circuit periodic, which is undesirable in that the amplified pulses die out more slowly, with continued reversals; while a relatively smaller capacity would lower the amplification. However, the relations specified are not highly critical.

The arrangement of Figure 4 is particularly suitable for a printing telegraph system, by employing a modification of the method used at present in transmitting. In printing telegraph systems, it is customary to use a five-element code, in which each letter or character is represented by five elements all of equal duration. There are no spaces between the elements of a letter or between letters. Each element has either current on or current off. Eleven such elements are illustrated at the top of Figure 4^A. It will be seen that several current-on elements occurring in succession result, in effect, in a long dash. If this method of transmission were employed, the circuits of Figure 1 or Figure 2 would be applicable. However, an improvement may be obtained, in accordance with this invention, by so transmitting that each current-on element has a duration of current somewhat less than half the period of the element, as illustrated in the second curve of Figure 4^A. The result is that all current pulses are of equal duration, but the spaces between them are of varying duration, due to the interposition of current-off elements. The general system described in connection with Figures 3 and 4 is therefore applicable to this case. The two lower curves of Figure 4^A illustrate this and correspond with the two lower curves of Figure 3^C.

Figures 5 and 6 show two forms of a complete radio receiver embodying the pulse-frequency amplifier arrangement of Figure 3, but employing the reflex principle to give two stages of tuned radio-frequency amplification without additional vacuum tubes. The tuned secondary coils, as $L_{s1}$, are made to have relatively low resistance; and the primary coils, as $L_{p1}$, are preferably given fewer turns than correspond to maximum amplification, to give sharp tuning (or high selectivity) at the wave frequency, as described in my mentioned patent. Essentially, Figures 5 and 6 different only in that the vacuum-tube filaments are in parallel in Figure 5, and in series in Figure 6. In both figures, the capacities $C_p$ and $C_{pd}$ plus $C'_{pd}$ correspond to $C$ in Figure 3; $C_g$ to $C'$; $R_p$ to $g$; and $R_g$ to $g'$. These capacities and resistances serve also to prevent undesired couplings in the radio-frequency circuits; the metal compartments act as electrostatic and electromagnetic shields; and the neutralizing capacities $C_{n1}$, $C_{n2}$, with their associated coils $L_{n1}$, $L_{n2}$, neutralize natural capacity couplings: all as described more fully in my United States Letters Patent No. 1,648,808 above referred to. The intensity of the response at the selector is controlled by adjusting a tap on the antenna coil $L_{pa}$. The different grids require different degrees of bias, which are attained in Figure 5 by the use of a tapped battery $B_c$, and in Figure 6 by connecting the different resistances $R_g$ to appropriate points in the series filament circuit. The values of $R_s$ and $C_r$ are chosen as in Figure 1.

Figure 7 shows a complete radio receiver embodying the pulse-frequency amplifier arrangement of Figure 4, but employing the reflex principle to give two stages of tuned radio-frequency amplification, as in Figures 5 and 6. In each pulse-frequency stage the condensers $C_1$ and $C_2$ serve as low-impedance by-passes for radio-frequency current. Together they take the place of the single secondary condenser $C$ of Figure 4 and are proportioned so that $$\tau^2 C = C_1 + \tau^2 C_2, \quad (11)$$

$C$ being determined by the rules given in connection with Figure 4.

I claim:

1. The method of receiving radio telegraph code signals with a minimum of interference, which comprises amplifying said signals at the wave frequency, highly attenuating interfering signals and disturbances at the wave frequency, detecting the amplified signals to produce electric pulses having the low frequencies involved in the transmitted signal code, amplifying said pulses at said low frequencies, attenuating interfering pulses of higher frequencies, and translating the amplified electrical pulses into mechanical motion.

2. In a radio telegraph receiving system, the combination of a multistage vacuum-tube amplifier, each stage of which is sharply tuned to the wave frequency, a vacuum-tube detector, a multistage vacuum-tube amplifier including electric coupling systems adapted to amplify at the signal pulse frequencies and to attenuate at higher frequencies whereby interference is minimized, and an electro-mechanical device actuated by the amplified pulses.

3. In a radio telegraph receiving system, the combination of a multistage vacuum-tube amplifier, each stage of which is sharply tuned to the wave frequency, a vacuum-tube detector, a multistage vacuum-tube amplifier including electric coupling systems adapted to amplify at the signal pulse frequencies and to attenuate at higher and lower frequencies whereby interference is minimized, and an electromechanical device actuated by the amplified pulses.

4. The method of radio telegraph signaling with a minimum of interference, which comprises transmitting signal pulses of fixed duration but separated by varying intervals in accordance with a code, detecting said signals to produce unidirectional pulses of corresponding duration, amplifying said unidirectional pulses by means adapted to amplify most effectively pulses of substantially said duration only and thereby to select against interfering pulses of different duration.

5. In a radio telegraph receiving system, a three-stage pulse-frequency vacuum-tube amplifier including in each stage an electric coupling system the time constants of which adapt it to amplify most effectively signal pulses substantially of a predetermined duration and including in the last stage means for substantially suppressing the initial and final swings of the three swings which tend to be produced in the output current by an impressed signal pulse, whereby the output current effectively reproduces the transmitted signal pulses and is affected to a minimum degree by interference.

6. In a radio telegraph receiving system, a pulse-frequency vacuum-tube amplifier stage comprising a vacuum tube whose output circuit is associated with coupling resistors and condensers only and includes a resistor and a condenser effectively in parallel, the time constant of said capacity in conjunction with the conductance of said coupling resistor and with the plate conductance of said vacuum tube is of the order of one-tenth to two-tenths of the duration of the shortest signal pulse to be amplified.

7. In a system for receiving radio telegraph signal pulses of fixed duration, a pulse-frequency vacuum-tube amplifier including in each stage a resistor connected in the plate-filament circuit of one vacuum-tube, a condenser effectively in parallel with said resistor, a second condenser connected between the plate of said vacuum-tube and the grid of the succeeding vacuum tube, and a second resistor connected between said grid and the filament of said succeeding vacuum-tube, the first-mentioned condenser having such a capacity that the time constant of said capacity in conjunction with the conductance of said first-mentioned resistor and with the plate conductance of the first-mentioned vacuum-tube is of the order of one-tenth to two-tenths of the duration of a signal pulse, and the second condenser having such a capacity that the time constant of said capacity in conjunction with the conductance of the second resistor is of the order of four-tenths to eight-tenths of the duration of a signal pulse.

8. In a telegraph system, the method of transmitting which comprises producing current pulses each of a certain value and of a fixed duration less than half a certain period, producing a second value of current during the remainder of said periods, and producing said second value of current for periods equal to and interspersed with the first-mentioned periods, in accordance with a code, whereby the signal pulses produced are suited to a receiving system adapted to amplify most effectively pulses substantially of a predetermined duration.

9. In a telegraph system, the method of transmitting which comprises producing current pulses each of a fixed duration less than half a certain period, producing zero current during the remainder of said periods, and producing zero current for periods equal to and interspersed with the first-mentioned periods, in accordance with a code, whereby the signal pulses produced are suited to a re-receiving system adapted to amplify most effectively pulses substantially of a predetermined duration.

10. In a telegraph system, the method of transmitting and receiving which comprises producing current pulses each of a certain value and of a fixed duration less than half a certain period, producing a second value of current during the remainder of said periods, producing said second value of current for periods equal to and interspersed with the first mentioned period, in accordance with a code, transmitting said pulses to a receiving station, and amplifying the received pulses by means adapted to amplify most effectively pulses of substantially said fixed duration only and thereby to select against interfering pulses of different duration.

11. In a telegraph system, the method of transmitting and receiving which comprises producing current pulses each of a fixed duration less than half a certain period, producing zero current during the remainder of said periods, producing zero current for periods equal to and interspersed with the first-mentioned periods, in accordance with a code, transmitting said pulses to a receiving station, and amplifying the received pulses by means adapted to amplify most effectively pulses of substantially said fixed duration only and thereby to select against interfering pulses of different duration.

12. In a radio telegraph receiving system including a detector and a plurality of amplifying stages adapted to amplify both at wave frequencies and at pulse frequencies, the combination in each stage of a vacuum tube and an output circuit, including coupling means tuned to a wave frequency and aperiodic coupling means adapted to amplify at the pulse frequencies only and at the same time to prevent undesired couplings between stages at wave frequencies.

13. In a radio telegraph receiving system including a detector and a plurality of amplifying stages adapted to amplify both at wave frequencies and at pulse frequencies, the combination in each stage of a vacuum tube and an output circuit, including coupling means tuned to a wave frequency and aperiodic coupling means adapted to amplify at the pulse frequencies only and at the same time to prevent undesired couplings between stages at wave frequencies, said coupling means comprising resistors and condensers only.

In witness whereof, I hereunto subscribe my name this 30th day of July 1926.

LOUIS A. HAZELTINE.

13. In a radio telegraph receiving system including a detector and a plurality of amplifying stages adapted to amplify both at wave frequencies and at pulse frequencies, the combination in each stage of a vacuum tube and an output circuit, including coupling means tuned to a wave frequency and aperiodic coupling means adapted to amplify at the pulse frequencies only and at the same time to prevent undesired couplings between stages at wave frequencies, said coupling means comprising resistors and condensers only.

In witness whereof, I hereunto subscribe my name this 30th day of July 1926.

LOUIS A. HAZELTINE.

CERTIFICATE OF CORRECTION

Patent No. 1,656,888.           Granted January 17, 1928, to

LOUIS A. HAZELTINE.

It is hereby certified that error appears in the printed specification of the above numbered patent requiring correction as follows: Page 5, line 60, for the word "valve" read "value"; page 6, line 59, for the word "different" read "differ", and line 100, strike out the syllable "in-"; and that the said Letters Patent should be read with these corrections therein that the same may conform to the record of the case in the Patent Office.

Signed and sealed this 14th day of February, A. D. 1928.

Seal.

M. J. Moore,
Acting Commissioner of Patents.

CERTIFICATE OF CORRECTION

Patent No. 1,656,888. Granted January 17, 1928, to

LOUIS A. HAZELTINE.

It is hereby certified that error appears in the printed specification of the above numbered patent requiring correction as follows: Page 5, line 60, for the word "valve" read "value"; page 6, line 59, for the word "different" read "differ", and line 100, strike out the syllable "in-"; and that the said Letters Patent should be read with these corrections therein that the same may conform to the record of the case in the Patent Office.

Signed and sealed this 14th day of February, A. D. 1928.

Seal.

M. J. Moore,
Acting Commissioner of Patents.